Re. 24332

Jan. 25, 1955  E. J. SVENSON  2,700,561

SEALING MEANS

Filed Jan. 7, 1949

INVENTOR.
Ernest J. Svenson
BY
Moore, Olson & Trexler
Attys.

United States Patent Office 2,700,561
Patented Jan. 25, 1955

2,700,561

SEALING MEANS

Ernest J. Svenson, Rockford, Ill.

Application January 7, 1949, Serial No. 69,797

3 Claims. (Cl. 286—7)

This invention relates to sealing means for relatively movable parts and more particularly to a sealing means adapted for use as a shaft seal.

In many applications a shaft in its guide will be subjected to an axial fluid pressure when it is desired that fluid should not pass therebetween. A simple and common application of this which will be used as an illustrative example is found in a valve in which it is desired that liquid should not pass between the valve stem and its bearing surface.

Previous to this invention, sealing rings have been placed in annular grooves either in the valve stem itself or in the bearing surface of its casing. The sealing ring placed in this annular groove has generally fallen into one of two classifications. In the first of these the sealing ring completely fills the groove and presents a surface which is either flat or pressed flat by pressure in contact with the bearing surface or valve stem, which results in considerable friction between the valve stem and its bearing surface. In the second class the annular groove is wider than the diameter of the cross section of the sealing ring and the ring is allowed to roll to some extent within the annular groove. The stem can be moved only a short distance axially before the ring encounters the edge of the groove and ceases to roll. It is then distorted so that a relatively large area is pressed against the bearing surface or valve stem, as the case may be, thus causing considerable friction.

It is an object of the present invention to present an improved shaft seal for preventing axial flow of liquids between a shaft and its bearing surface.

More specifically stated, it is an object of this invention to present such a seal which offers a minimum of resistance to relative axial movement between the shaft and its bearing.

Other and further objects of the present invention will become apparent to those skilled in the art from a perusal of the following description with reference to the accompanying drawings, in which.

Figure 1:
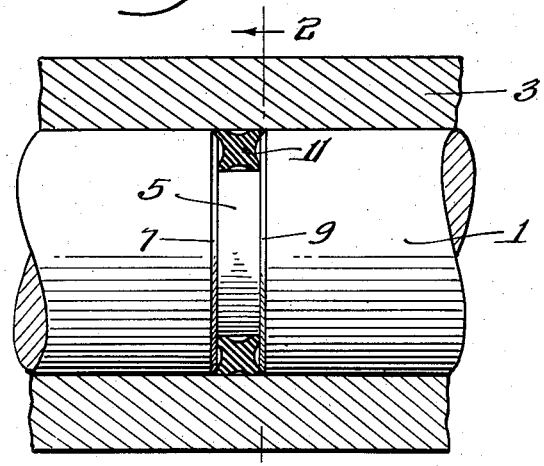
Figure 1 is a side view of a valve stem or the like showing the casing and the sealing means in cross section.
Figure 2:
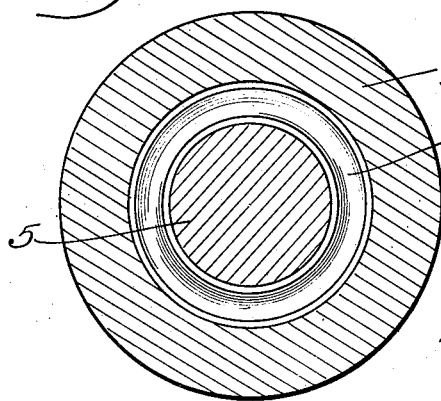
Figure 2 is a cross section taken on the line 2—2 in Figure 1.
Figure 4:
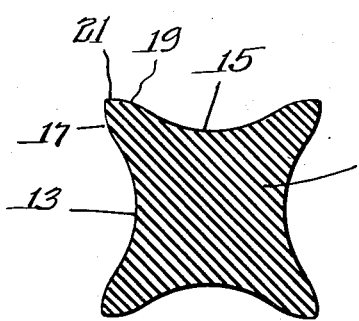
Figure 4 is a further enlarged cross section of the sealing means.

In Figure 1 the valve stem 1 is shown in position in contact with its bearing member 3. An annular groove 5 having bevelled edges 7 and 9 is shown in the valve stem although it is to be understood that this annular groove could just as well be in the bearing member 3. Within the annular groove 5 is a sealing ring 11 of rubber or the like material, the cross sectional shape of which may be best seen in Figure 4. This cross section roughly approximates a square which has each of its four sides cut out to resemble a scallop. Each side of the cross section, as for example 13 and 15, is an arc of a circle whose center lies at some distance outside the sealing ring. The arcs of the sides 13 and 15 do not merge directly into each other to form a sharp point, but rather each merges into a smaller arc of reverse curvature having its center within the body of the sealing ring. The arc of the side 13 merges into a smaller arc 17 and the arc of the side 15 merges into an arc 19 which is similar to the arc 17. Although in the preferred embodiment shown the arcs 17 and 19 do not have a common center it is contemplated that a common center could be used so that the arcs 17 and 19 would be a single arc and a rounded configuration rather than a somewhat pointed one would be presented at 21 in the cross section of the sealing ring.

Figure 3:
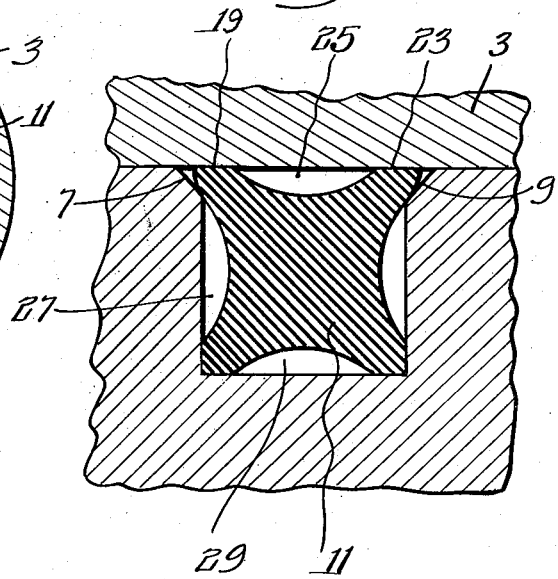
Figure 3 is an enlarged sectional view showing the sealing means in a position in the annular groove in the valve stem and in contact with the bearing member.

The width and height of the sealing ring are slightly more than the corresponding dimensions of the annular groove in which it is seated so that it will be under a very slight compression. This causes the arc 19 and the corresponding arc 23 to flatten out slightly against the bearing member 3, as shown in Figure 3, and thus present contact over a small area rather than presenting a mere point of contact. Assuming that the liquid is to be left in Figures 1 and 3 it may be readily seen that a small amount of liquid will move axially to the right and fill the three spaces 25, 27 and 29 between the scalloped sides of the sealing ring and the valve stem and its casing. These will then aid in the sealing and the liquid in the space 25 will further act as a lubricant between the sealing ring 11 and the casing 3. It is apparent that as only a small area is presented for frictional contact between the sealing means and the bearing member 3 there may be a greater radial pressure exerted between them to facilitate the sealing action than if a large contacting area were present. It may likewise be seen that the bevelled edges 7 and 9 of the annular groove prevent sharp edges from coming in contact with and possibly injuring the sealing ring.

The great problem in constructing a shaft seal is to prevent axial leakage of fluids without engendering such great frictional forces as to preclude axial or rotative movement of the shaft and to maintain this condition for an extended period of time. The sealing ring herein disclosed provides spaced sealing areas each of narrow extent. The spaced sealing areas prevent leakage and the narrowness of each area, due to the unique curvature of the edges of the ring, prevents grabbing of the shaft which would preclude or severely limit shaft movement while at the same time wearing the seal excessively. The thin edges provided by the unique curvature flex relatively readily when the seal is initially installed in compressed condition and the resulting restoring force maintains the seal in proper sealing condition as the edges wear away somewhat after extended use.

The instant invention has thus presented a superior sealing means for preventing the axial flow of liquid between a shaft or valve stem and its bearing surface. Due to its novel construction this sealing means presents a minimum of frictional resistance and yet maintains a maximum sealing action.

Although for purposes of illustration a specific embodiment has been shown and described, it is to be understood that this invention is to be limited only by the following claims.

I claim:

1. The combination comprising a substantially cylindrical shaft having a bearing surface, a casing about said shaft and having a bearing surface, one of said bearing surfaces having an annular groove of predetermined width and depth and said annular groove having relieved edges along the bearing surface, and an annular sealing ring of rubber or like resilient material positioned in said groove and of generally square cross section somewhat greater than the width and depth of said annular groove, said sealing ring having shallow inwardly curved recessed portions along each face, the body portion of the ring between said recessed portions constituting the central and major cross section of the ring, the corners of the ring comprising projecting portions which are relatively narrow and short as compared with the major central cross section of the ring whereby to strengthen said projecting portions for maintaining their relative positions when installed without substantial distortion, the said projecting portions having the edges thereof merging into adjacent recessed portions along reversely curved surfaces with each pair generally tapering toward one another and adapted to be compressed and somewhat flattened upon installation for creating reactive forces therein tending to maintain the relative sealing positions of the projecting portions, and a pair of said projecting portions extending into the relieved edges of said groove along the bearing surfaces and affording with the included recessed portion therebetween relatively narrow wear surfaces to prevent any substantial increase of friction surface contact area upon wear thereof.

2. The combination comprising a substantially cylindrical shaft having a bearing surface, a casing about said shaft and having a bearing surface, one of said bearing surfaces having an annular groove of predetermined width and depth and said annular groove having relieved edges along the bearing surface, and an annular sealing ring of rubber or like resilient material positioned in said groove and of generally square cross section somewhat greater than the width and depth of said annular groove, said sealing ring having a scallop removed from each face to provide corner projecting portions relieved to form acute angles, and a pair of said corner projecting portions being positioned within the relieved edges of said annular groove and in engagement with the opposite bearing surface to prevent pinching of said corner portions between the bearing surfaces and to afford spaced relatively narrow wear surfaces along the edges of the removed scallop therebetween.

3. The combination comprising a substantially cylindrical shaft having a bearing surface, a casing about said shaft and having a bearing surface, said shaft having an annular groove open toward said casing with the radially outer extremity of the side edges of said groove beveled along the bearing surface, and an annular sealing ring of rubber or like resilient material positioned in said groove and of generally square cross section somewhat greater than the width and depth of said annular groove, said sealing ring of generally square cross section having a portion removed from each face to provide projecting corner portions, the extreme width and depth of the cross section of said ring being somewhat greater than the width and depth of said annular groove, and a pair of said projecting corner portions being positioned within said beveled edges and affording at opposite edges of the included removed portion a pair of relatively narrow wear surfaces which are flattened and compressed by contact with the other bearing surface.

References Cited in the file of this patent

UNITED STATES PATENTS

| | | |
|---|---|---|
| 511,734 | Hoffstadt | Dec. 26, 1893 |
| 874,652 | Bailey | Dec. 24, 1907 |
| 1,770,193 | Bragg et al. | July 8, 1930 |
| 2,208,620 | Baisch | July 23, 1940 |
| 2,274,234 | Ekkebus et al. | Feb. 24, 1942 |
| 2,282,825 | Puffer | May 12, 1942 |
| 2,309,446 | Ekkebus | Jan. 26, 1943 |
| 2,445,410 | Smith | July 20, 1948 |
| 2,471,759 | Lowrey | May 31, 1949 |

FOREIGN PATENTS

| | | |
|---|---|---|
| 495,874 | Great Britain | Nov. 22, 1938 |
| 550,298 | France | of 1923 |